March 18, 1958     E. A. NEUGASS     2,827,557
INSTRUMENT LIGHTING DEVICE
Filed Nov. 2, 1955
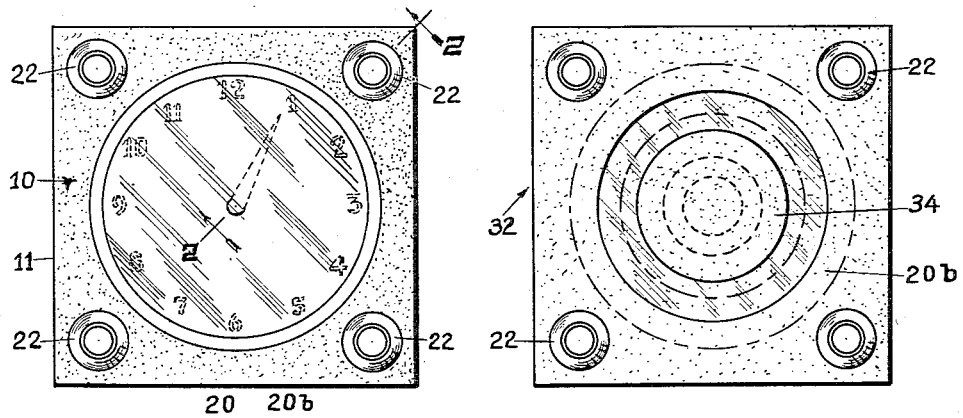
FIG. 1.     FIG. 5.
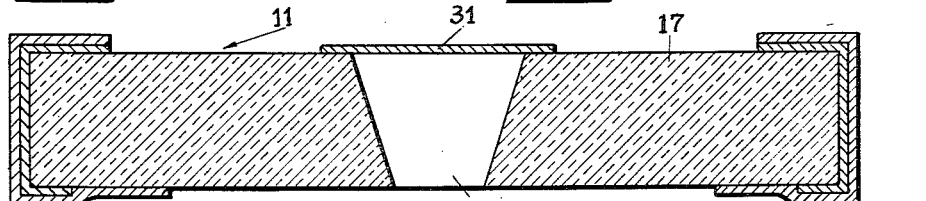
FIG. 3.
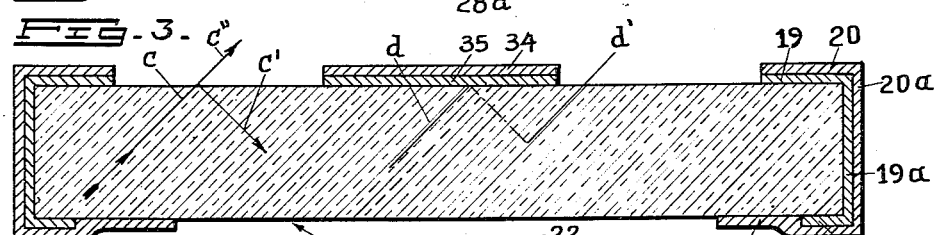
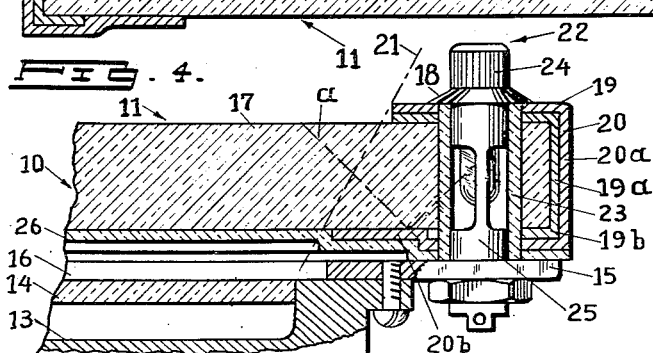
FIG. 2.
*INVENTOR.*
EDWIN A. NEUGASS.
BY
MAXWELL E. SPARROW.
ATTORNEY United States Patent Office 2,827,557
Patented Mar. 18, 1958

2,827,557

INSTRUMENT LIGHTING DEVICE

Edwin A. Neugass, Poteau, Okla.

Application November 2, 1955, Serial No. 544,548

2 Claims. (Cl. 240—2.1)

The present invention relates generally to devices for illuminating instrument faces, and is particularly related to devices for externally illuminating the faces of instruments enclosed in sealed cases or housings.

The instant application embraces subject matter disclosed in my copending patent application Serial No. 258,215, filed November 26, 1951, now Patent No. 2,723,342, and is a continuation-in-part thereof.

Many sensitive instruments, for example, aircraft instruments, are contained in sealed cases or housings with the indicating faces thereof positioned behind fixed glass. Heretofore, the indicia on the faces and the hands of such instruments have been coated with fluorescent or phosphorescent pigments of a light color which glow when subjected to ultra-violet radiations, and a source of ultra-violet radiations, positioned in cockpit, directed at the faces of the instruments to cause the pigmented indicia and hands to glow. However, when this form of illumination is employed in the cockpit or control station of an airplane or other vehicle, the flow emitted from the fluorescent or phosphorescent pigments, and lingering or continuing after the source of ultra-violet radiations has been removed or deenergized, disturbs the dark adaptation of the pilot's or observer's eyes.

Since it is known that red light does not appreciably impair the dark adaptation of the pilot's eyes, it is the principal object of the present invention to provide devices which employ red light for illuminating the faces of sealed instruments.

Another object is to provide devices for illuminating the faces of sealed instruments of the described character which are effective to direct red light against the faces of the related instruments so that the indicia and hands of the instruments reflect the red light forwardly toward the observer, while preventing the escape of any light toward the observer, with the exception of the above mentioned reflected red light.

A further object is to provide illuminating devices having the aforementioned characteristics which are constructed so that the faces of the related instruments may be viewed along lines of sight which form angles of at least 30° with the perpendiculars to the faces of the instruments.

A still further object is to provide illuminating devices of the described character which are effective to uniformly illuminate the faces of the related instruments.

In accordance with the present invention, the above objects are achieved by providing a panel of transparent plastic material mounted in front of the instrument. With the exception of the portion of the plastic panel overlying the face of the instrument, the front and rear surfaces of the panel, as well as the edges of the latter, are covered first with a layer of light-colored material, preferably white, and then with an outer layer of dark, preferably black, opaque material to prevent escape of light from the portions of the panel covered thereby. Light emitting sources, encased in red-colored filters, are mounted within the transparent plastic panel adjacent the periphery of the latter to emit rays of light converging toward the center of the panel.

In one embodiment of the invention, the rear surface of the panel is coated with a layer of colorless, transparent lacquer having an index of refraction close to the value 1.0 so that there is little reflection of light rays forwardly from the rear surface in the direction toward the observer to interfere with the sharp definition of the indicia and hands of the instrument face of light reflected from the latter.

In accordance with another embodiment of the invention, the central portion of the front surface of the transparent panel is covered first with a light-colored, preferably white, layer and then with a layer of dark, preferably black, opaque material which increases the rearward reflection of light in the direction toward the instrument face of the area of the panel remote from the light emitting sources so that the illumination of the instrument face is substantially uniform over its entire area.

In accordance with still another embodiment of the invention, the transparent panel is formed with a central opening which is tapered rearwardly so that the inclined wall thereof is operative to reflect the converging light rays toward the rear for intensifying the illumination of the instrument face at the areas remote from the light emitting sources.

The above and other objects, features and advantages of the present invention will be apparent in the following description of preferred embodiments thereof when read in connection with the accompanying drawings forming a part of this specification and wherein:

Fig. 1 is a front elevational view of an illuminating device constructed in accordance with an embodiment of the present invention and shown mounted in front of an instrument having a sealed casing;

Fig. 2 is a fragmentary sectional view taken along the line 2—2 of Fig. 1 and on an enlarged scale;

Fig. 3 is a sectional view, somewhat enlarged, showing the illuminating device apart from an instrument being illuminated;

Fig. 4 is a sectional view, similar to Fig. 3, but showing a slightly modified form of illuminating device in accordance with the present invention; and Fig. 5 is a front elevational view of an illuminating device constructed in accordance with Fig. 4.

Referring to the drawings in detail, and initially to Figs. 1 and 2 thereof, an illuminating device, generally identified by the numeral 10 and constructed in accordance with an embodiment of the present invention, is there shown. The illuminating device 10 includes a panel, generally indicated by the numeral 11, which is mounted in front of an instrument 12 (Fig. 2) having a sealed case and an indicating face 13 which is positioned in back of a fixed glass 14. The instrument 12 is mounted in a conventional manner upon a metal instrument panel 15 with the face of the instrument in registration with a suitable opening formed in the panel 15.

The panel 11 forming a part of the illuminating device 10, includes a core or body 17 of transparent, light transmitting sheet material, preferably plastic, for example, methylmethacrylate, which is preferably of rectangular or square configuration and has an opening 18 formed therethrough adjacent each of the corners thereof. When the instrument to be illuminated by the device 10 has a circular face, a circular area at the center of each face of the body 17 is polished, while the remainder of the front face of the body 16 is covered with a light colored, preferably white layer 19 and an outer layer of dark colored, preferably black, opaque material, as at 20. The edges of the transparent body 17 are similarly covered by white and black layers 19a and 20a, respectively, which are continuations of the layers 19 and 20 at the front face of the body 17. The white layer 19a at the edges of the body 17 is continued over the rear surface of the latter, as at 19b, while the outer, black and opaque layer 20a is continued over the layer 19b, as at 20b. It will be noted that the outer layer 20b extends further toward the center of the panel 11 than does the layer 19b and the layers 19 and 20, and that the layer 19b terminates closer to the edge of the panel than do the layers 19 and 20. Thus, when the panel is viewed from the front, the layer 20b of dark, and hence non-reflecting material, defines a circular area of substantially the same diameter as the face 13 of the instrument through which the latter may be viewed, while the layers 19 and 20 at the front of the panel define a circular area, of a diameter greater than that of the instrument face, so that the latter is visible even when viewed along sight lines disposed at substantial angles from the axis of the instrument, for example, the line 21 which is inclined at least 30° from the axis of the instrument. Further, since the white layer 19b is cut back relative to the edges of the layers 19 and 20, the first mentioned white layer will normally not be visible from the front.

While the layers 19 and 20, 19a and 20a, 19b and 20b may be formed of suitable paints which are brushed or sprayed successively on the body 17, in the event that it is desired to provide illuminated indicia (not shown) at the front of the panel 11, the inner white layers are preferably formed of a translucent plastic material and the outer black layers are preferably formed of an opaque plastic material, applied in the manner and of the materials detailed in United States Letters Patent No. 2,518,726, so that, when openings are cut through the front opaque layer to define indicia, the translucent layer will be transilluminated at the portions thereof underlying such openings by light transmitted through the transparent body 17.

Light rays are admitted to the body 17 of the panel 11 by light assemblies, each generally indicated by the numeral 22, which are mounted within the various openings 18 of the body 17. Each assembly 22 includes a cylindrical red colored transparent filter 23 which fits into the related opening 18, and a panel light unit 24 of conventional design, such as, panel lights manufactured under part No. A4295, by the Grimes Manufacturing Co., Urbana, Ohio. Since the panel light unit 24 is a conventional and easily obtainable part, no explanation or description of its details of construction will be entered into in this description. It will be merely noted, that the panel light 24 includes a sleeve 25 within which the light bulb is positioned, and having cutouts in the side walls thereof to permit light rays from the bulb to be emitted radially through the filter 23. As seen in Fig. 2, the light units themselves may be employed for mounting the panel 11 upon the instrument panel 15.

With reference to the above description, it will be apparent that the several light units 24, when energized, will emit rays of light which converge toward the center of the body 17, with the transparent material of the latter being effective to transmit the light throughout its length and width. The light rays passing through the body 17 will impinge against the front and rear surfaces of the latter at varying angles, and will be in part reflected from such surfaces for transmission throughout the body. In order to minimize the reflection of light rays from the rear surface of the body 17, and thereby to cut down the intensity of the red light escaping forwardly from the body 17, a layer 26 of colorless, transparent lacquer, having an index of refraction close to the value 1.0 is provided in accordance with the present invention on rear surface of the body 17. The layer 26 is of an approximate thickness equal to an odd number of half wave lengths, so that reflections from the surfaces of the layer will cancel and substantially reduce total reflection. The layer 26 is effective to cut down the unwanted reflection and thereby prevent interference of forwardly reflected light with the sharp definitions of the indicia and hands of the instrument face by light reflected from the latter. The escape of light forwardly towards the observer, other than that reflected from the face of the illuminated instrument, is further resisted by the manner in which the outer black layer 20b overlies, or extends further inward than, the white layer 19b. Thus, as seen in Fig. 2, a ray $a$ emitted from the bulb of the light unit 24 and impinging against the rear surface of the body 17, at an angle which would normally result in its forward reflection at an angle steep enough, with respect to the front surface of the body 17, so that a substantial portion of the intensity of the ray would escape from the body, instead impinges against the overlying portion of the black layer 20b and is absorbed by the latter. Further, since the inner edge of the white layer 19b is cut back with respect to the inner edges of the front layers 19 and 20, the light impinging against this rear white colored layer will not normally be visible from the front of the panel.

Referring to Fig. 3 of the drawing, wherein a further modification is illustrated, it will be seen that the body 17, of the illuminating device panel 11, is formed with an opening 28a located centrally and tapering towards the rear surface. In the embodiment of Fig. 3, the surface of the opening 28a is highly polished in order to obtain the necessary reflection rearwardly of the light impinging thereagainst. A plate 31, of suitably opaque material, is positioned across the front end of the opening 28a in order to prevent forward travel of light rays which may break through the polished surface of the opening 28a. The rearwardly tapering opening 28a thus serves to reflect rearwardly the light rays impinging against the surface of the opening to increase illumination centrally of the panel, remote from the light sources, and thereby achieve substantially uniform illumination over the entire face of the instrument.

Referring now to Figs. 4 and 5 of the drawing, wherein reference numerals employed in Figs. 1, 2 and 3 are utilized for identifying the same parts, an illuminating device, generally indicated by the numeral 22, and constructed according to a further embodiment of the present invention, is there illustrated.

The illuminating device 32 includes a panel 11 formed of the previously described body or sheet 17 having the various masking layers 19 and 20, 19a and 20a, and 19b and 20b, applied thereto, and the light emitting units 22 positioned at the four corners of the panel, to direct converging rays of light into the transparent body 17. The embodiment of Figs. 4 and 5 differs from those previously described, in that the central portion of the front face of the body 17 is covered by a first layer 35 of light colored, preferably white, material, and then an outer layer 34, superimposed upon the layer 35, and formed of dark colored, preferably black, opaque material. The layers 35 and 34 are preferably circular, as seen in Fig. 5, when the associated instrument face is also of circular configuration.

The layers 35 and 34 of the panel in Figs. 4 and 5 are effective to promote the uniform illumination of the instrument face positioned therebehind in the following manner:

Light rays, such as the ray $c$, which impinge against the front surface of the body 17 at points relatively close to the light sources 22 are in part reflected rearwardly, as at $c'$ and in part escape from the front surface of the body 17, as at $c''$. Since the intensity of the rays $c$, which are relatively close to the light sources, is greater than those at locations within the body 17, remote from the light sources, the escape of the light rays, characterized by the ray $c''$, does not appreciably decrease the intensity of the light directed rearwardly for illuminating the instrument face. However, light rays, such as the ray $d$, which are passing through portions of the body 17 relatively remote from the light sources 22 and strike against the front surface of the body 17 at the central portion thereof, impinge against the while layer 35, and are entirely reflected rearwardly, as at d', so that these light rays of relatively low intensity are entirely reflected rearwardly to thereby increase the relative intensity of illumination at the center of the instrument face. Thus, the illumination over the entire area of the instrument face is made to be substantially uniform.

While the modifications of the present invention illustrated in Figs. 3, 4 and 5, are not shown to include a layer of colorless transparent lacquer on the rear surface of the light transmitting bodies thereof, such as is illustrated at 26 in Fig. 2, it is understood that such layer may be, if desired, incorporated in any of the modifications mentioned above, and when so incorporated will function as in the embodiment of Figs. 1 and 2 to reduce the intensity of light reflected forwardly from the rear surface of the light transmitting body 17.

From the foregoing description of illustrative examples, it is apparent that the present invention provides devices for illuminating instruments in sealed cases with red colored light and that such devices, necessarily independent of the related instruments, permit viewing of the instrument faces from a wide range of points of view without producing glaring light directed at the observer and without impairing the dark adaptation of the observer's eyes. Further, while only one illuminating device constructed in accordance with each of the several embodiments is shown associated with a single instrument, it is to be noted that the square configuration of the various panels 11 permits the side by side arrangement of a plurality of such panels for the purpose of illuminating a series of instruments, such as are usually mounted on an aircraft panel.

While I have illustrated several preferred embodiments of the invention, it is to be understood that the illustrated and described constructions are presented by way of example only, and that many modifications and changes obvious to one skilled in the art may be effected therein without departing from the spirit or scope of the invention as defined in the appended claims.

What I claim is:

1. An instrument illuminating device comprising a sheet of light transmitting material adapted to be mounted in front of an instrument face, masking means on the edges of said sheet and on portions of the front and rear surfaces of the sheet extending to said edges defining uncovered areas of said surfaces through which the instrument face may be viewed, light emitting means disposed at several locations adjacent to the periphery of said sheet and directing light rays toward the center of said uncovered areas of said sheet for illuminating an instrument face therebehind, and additional masking means covering the central portion of said front surface of the light transmitting means and disposed within said uncovered area of said front surface, said additional masking means including a layer of light colored material superposed directly on said sheet and an outer layer of dark colored opaque material superposed on said layer of light colored material and coextensive therewith so that light rays impinging against said additional masking means are reflected rearwardly thereby to intensify the illumination at the center of an instrument face viewed through said uncovered areas and to provide uniform intensity of illumination of the face without regard to the distance from said light emitting means.

2. An instrument illuminating device as in claim 1; wherein the first mentioned masking means includes an inner layer of light colored material superposed directly on said sheet of light transmitting material for reflecting light rays impinging thereagainst, and an outer layer of dark colored, opaque material, the layers of light colored and dark colored materials of said first masking means being coextensive on said front surface of said sheet of light transmitting material, while said layers of light colored and dark colored materials of said first masking means extend substantially smaller and larger distances, respectively, from said edges at said rear surface than at said front surface of the sheet of light transmitting material, so that the uncovered area of said rear surface is smaller than the uncovered area of said front surface and is bounded by a portion of said opaque dark colored layer of said first masking means which absorbs light rays impinging thereagainst, thereby to prevent forward escape of light, through said uncovered area of the front surface, of light rays impinging against said first masking means at the periphery of said uncovered area of the rear surface.

References Cited in the file of this patent

UNITED STATES PATENTS

| | | |
|---|---|---|
| 2,128,246 | Hardesty | Aug. 30, 1938 |
| 2,518,726 | Shlenker | Aug. 15, 1950 |
| 2,602,036 | Sullivan | July 1, 1952 |
| 2,723,342 | Neugass | Nov. 8, 1955 |

FOREIGN PATENTS

| | | |
|---|---|---|
| 492,258 | Great Britain | Sept. 12, 1938 |